(12) United States Patent
Skvorecz

(10) Patent No.: US 6,520,354 B1
(45) Date of Patent: Feb. 18, 2003

(54) SHORT STACK WIRE CHAFING STAND

(76) Inventor: Robert Skvorecz, c/o Skorr Products, Inc., 90 George St., Patterson, NJ (US) 07503

( * ) Notice: Subject to any disclaimer, the term of this patent is extended or adjusted under 35 U.S.C. 154(b) by 0 days.

(21) Appl. No.: 09/933,374

(22) Filed: Aug. 20, 2001

(51) Int. Cl.[7] .............................................. A47G 23/02
(52) U.S. Cl. ..................... 211/181.1; 248/153; 248/175
(58) Field of Search ....................... 211/181.1; 248/153, 248/175, 176.2

(56) References Cited

U.S. PATENT DOCUMENTS

| | | | | |
|---|---|---|---|---|
| 3,848,748 A | * | 11/1974 | Ceccarelli | 211/181.1 |
| 5,287,800 A | * | 2/1994 | Orednick | 211/189 |
| 5,819,640 A | * | 10/1998 | Cuomo et al. | 126/261 |
| 5,921,513 A | * | 7/1999 | Skvorecz | 248/153 |
| 6,047,932 A | * | 4/2000 | Skvorecz | 248/153 |
| 6,234,068 B1 | * | 5/2001 | Sherman | 211/181.1 |

* cited by examiner

*Primary Examiner*—Daniel P. Stodola
*Assistant Examiner*—Erica B. Harris
(74) *Attorney, Agent, or Firm*—Anderson Kill & Olick; Eugene Lieberstein; Michael N. Meller

(57) ABSTRACT

The wire chafing stand of the present invention includes a rim of wire steel in a substantially rectangular configuration, lateral sides and a longitudinal axis extending from the lateral sides, at least two wire legs and a wire connecting assembly. In the preferred embodiment, the wire stand has only two wire legs lying in planes transverse to the longitudinal axis with each wire leg having two upright sections affixed to the longitudinal side of the rim.

11 Claims, 7 Drawing Sheets

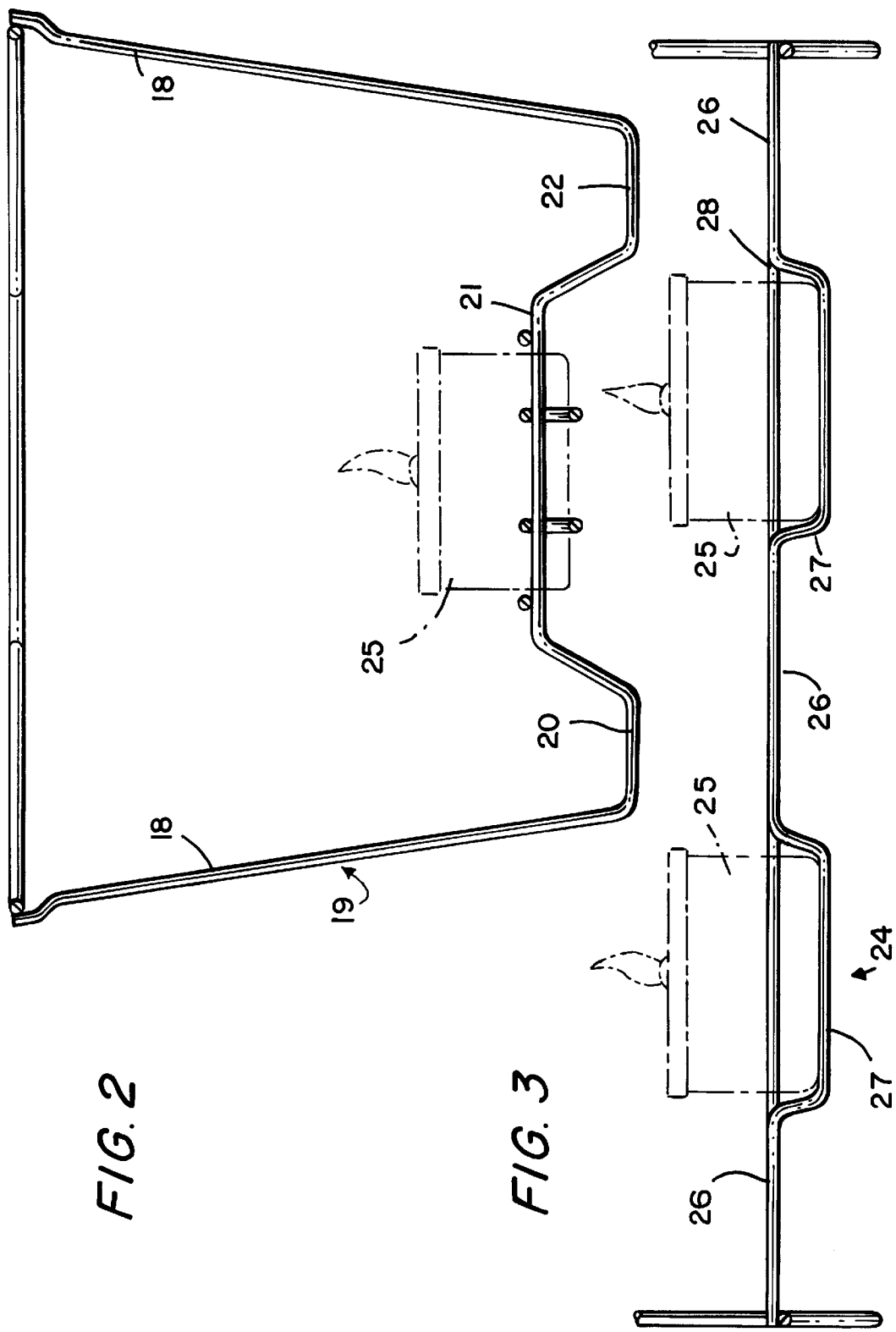

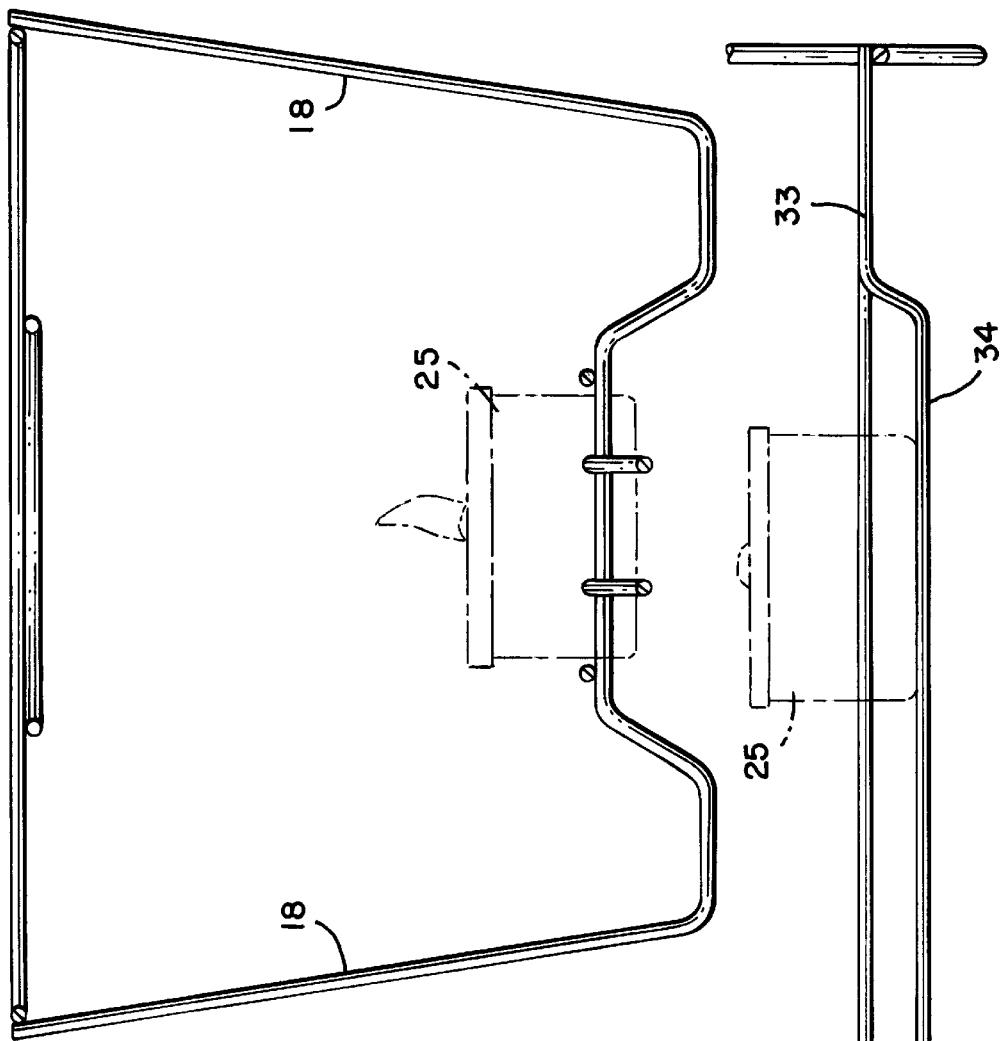

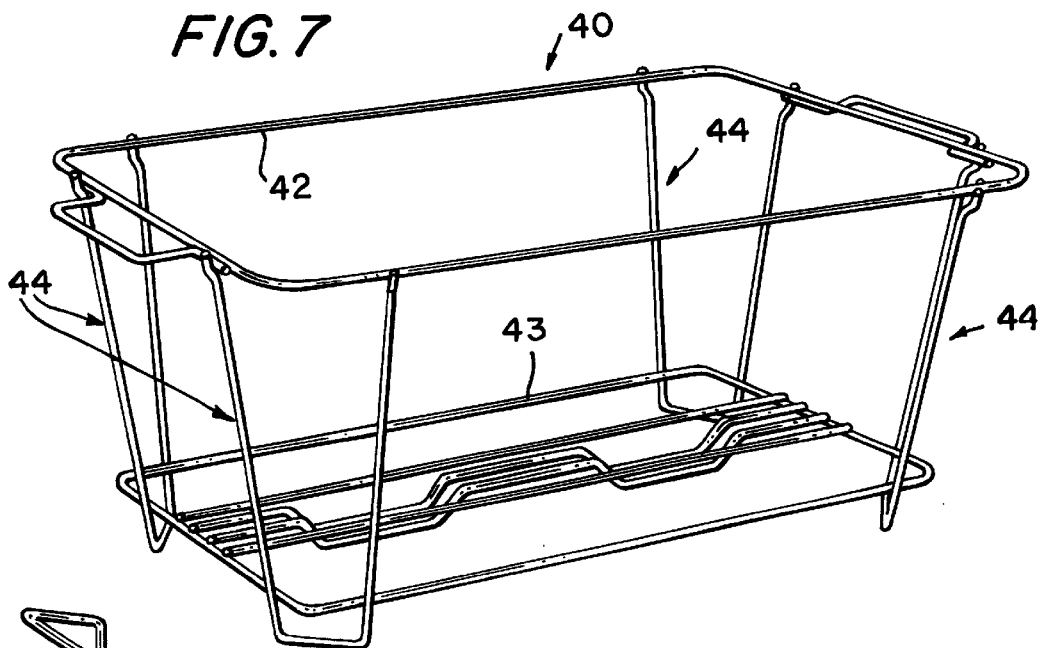
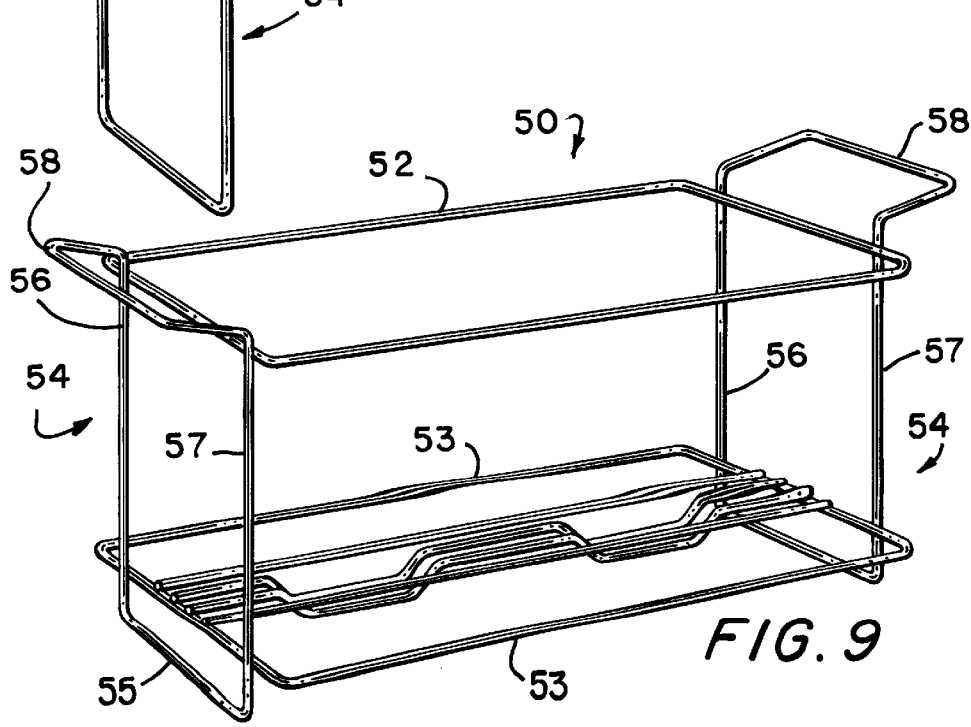

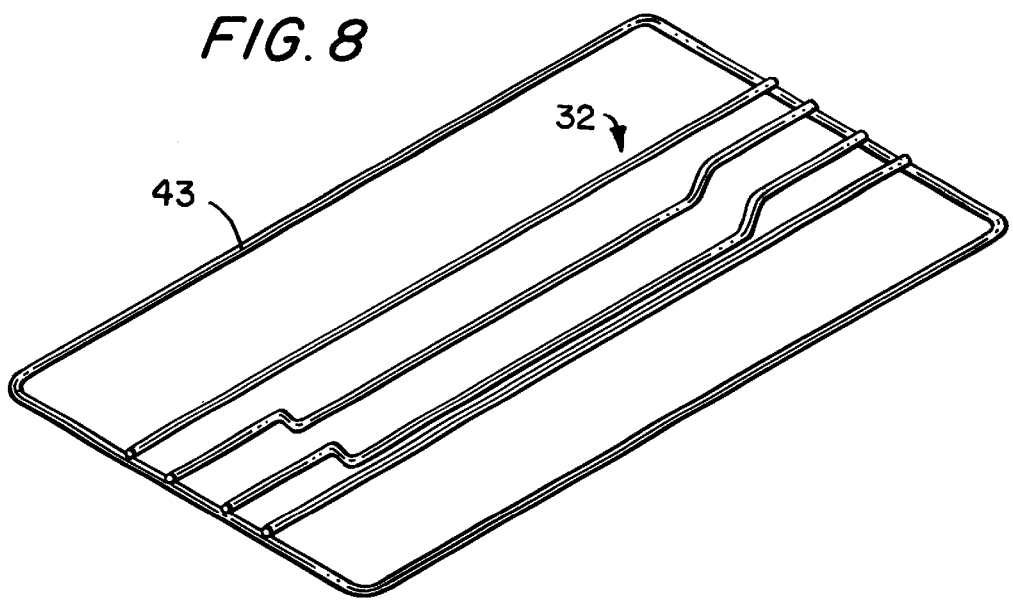
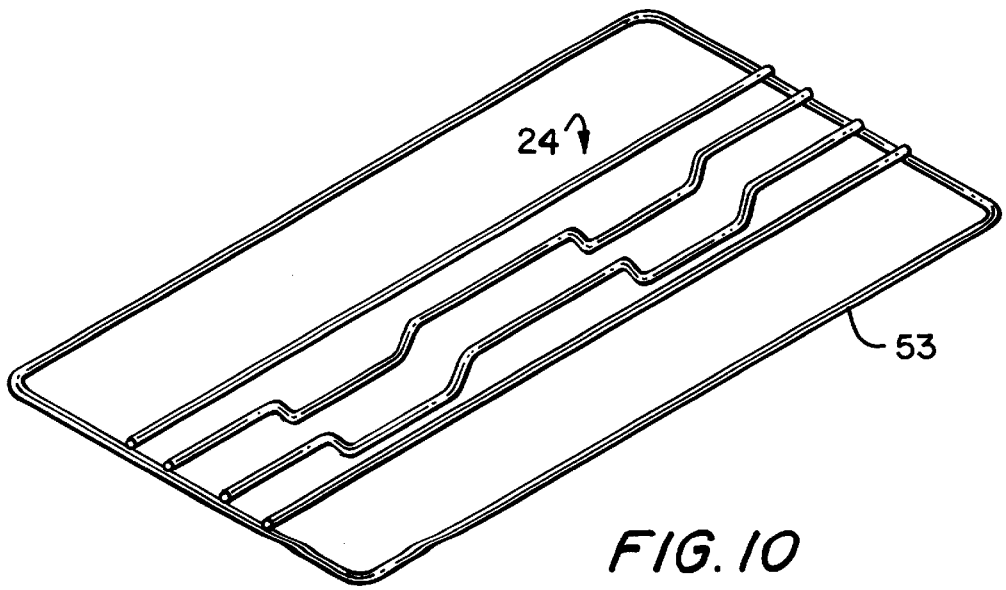

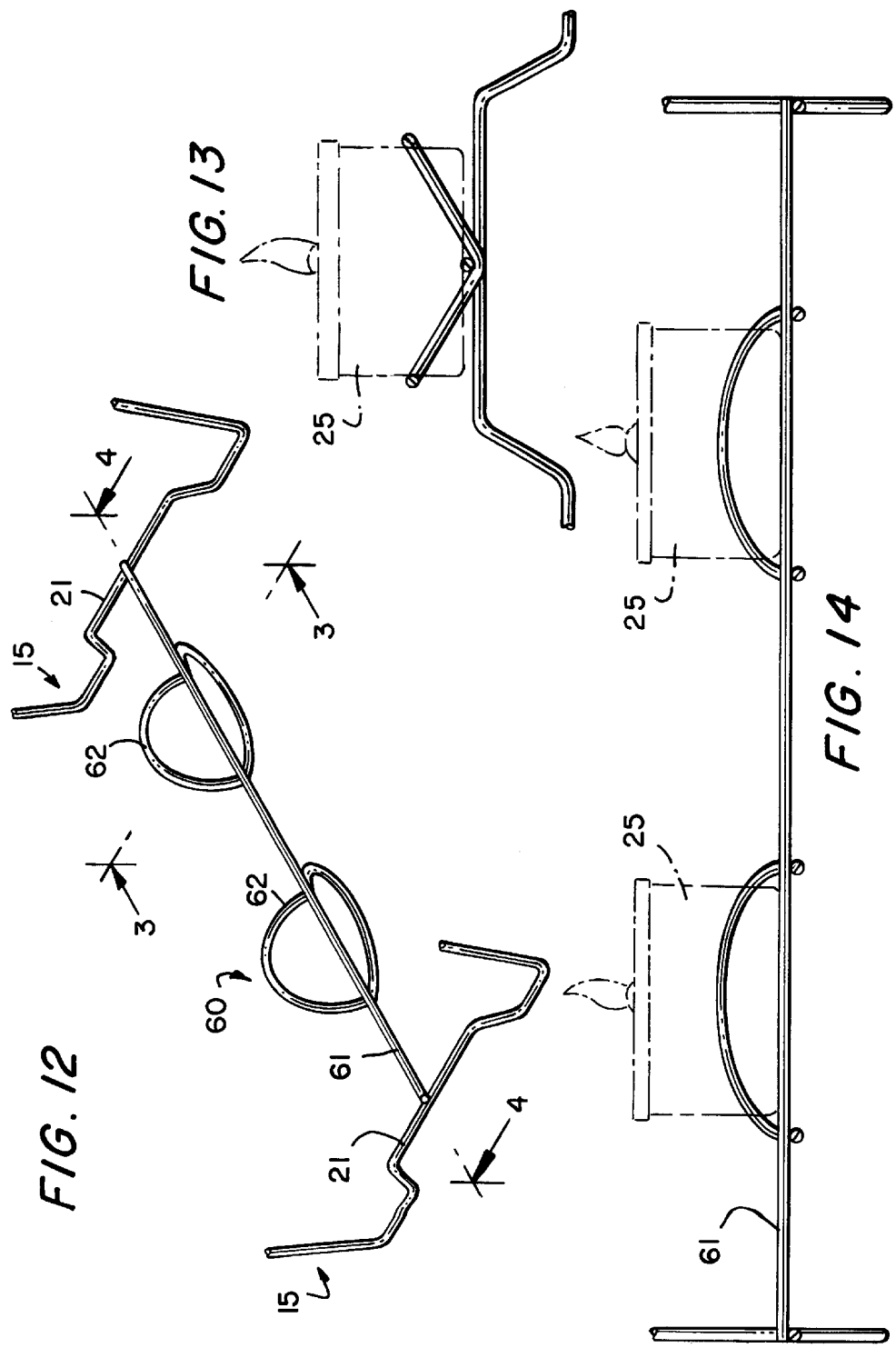

SHORT STACK WIRE CHAFING STAND

FIELD OF INVENTION

This invention relates to an improved wire chafing stand which can be readily stacked in a nested relationship with other wire chafing stands of the same design for compact storage and transportation.

BACKGROUND OF THE INVENTION

A wire chafing stand is a device used to support aluminum pans and auxiliary fuel heaters for maintaining and heating pre-cooked food at a remote location from the kitchen where the food was originally prepared and cooked. The cost of transportation from the point of manufacture to the distributor and/or to the retailer is a critical economic factor in the pricing of the wire chafing stand.

The chafing stand is designed as an open structure preferably of wire rod steel having predetermined physical dimensions as needed to hold, support and heat a chafing dish when placed thereon. Although the chafing stand has little weight its physical dimensions occupy substantial volume. Accordingly, to minimize the cost of shipping and transportation the chafing stand must be designed to permit a multiple number of stands to be nested together in a compact arrangement in which the nested stands are readily separated from one another for independent usage. Each stand must also function to support a plurality of chafing fuel heaters for heating a chafing dish on the chafing stand. To minimize the cost of manufacture, the wire chafing stand should be designed for minimal human handling and provisions for the chafing fuel heaters should be integral to the design of the stand.

A commercially available chafing stand is described by applicant in U.S. Pat. No. 5,921,513 the disclosure of which is herein incorporated by reference. This chafing stand includes a separate upper and lower wire rim interconnected by means of symmetrically positioned wire legs at each corner of the stand which in combination with the upper and lower rim construction provides the structural support for the stand. The lower rim is designed to include a plurality of holders for chafing fuel heaters.

SUMMARY OF THE INVENTION

The wire chafing stand of the present invention is preferably constructed using only one wire rim and has at least two supporting legs extending therefrom. This significantly reduces the cost of manufacture relative to the stand described in U.S. Pat. No. 5,921,513. When the design is limited to two legs, each should extend from the rim on opposite lateral sides of the stand in a configuration which keeps the stand level with the ground and provides ample structural support for the stand. The rim may have any desired geometry although a rectangular geometry is preferred. The lateral sides of the rim may have handles for manually lifting the chafer from the chafing stand. These handles may be integrally formed as part of the lateral sides of the rim or separately welded thereto. A wire holder connector assembly is used to bridge the legs for supporting chafing fuel heaters. An alternate embodiment of the present invention employs two wire rims similar in construction to the stand described in U.S. Pat. No. 5,921,513 but with an improved lower rim design for supporting multiple holders of chafing fuel heaters.

The preferred wire chafing stand embodiment of the present invention comprises a single rim of generally rectangular configuration having two lateral sides and two wire legs. Each wire leg is in a configuration forming two upstanding sections and a bottom section. The bottom section may be further divided into a plurality of segments including, e.g., two flat segments and a raised segment. The bottom section keeps the stand level with the ground. The stand also includes a wire holder connector assembly which is preferably connected to the raised section of each wire leg to support a plurality of chafing fuel heaters. The wire legs are preferably welded to the rim near the lateral sides of the stand and preferably include an offset adjacent the interconnection of the wire leg to the rim to facilitate the nesting of multiple stands in tandem so as to minimize space for shipping and transporting multiple chafing stands. The offset in each leg laterally displaces the leg relative to the point of attachment with the rim so that the wire legs in one chafing stand can nest a substantial distance within another chafing stand with the rim of each stand in close proximity without causing significant wedging to occur.

BRIEF DESCRIPTION OF THE DRAWINGS

Other advantages of the present invention will become apparent from the following detailed description of the invention when read in conjunction with the accompanying drawings of which:

FIG. 2 is an end view taken along the lines 2—2 of FIG. 1;

FIG. 3 is a front view taken along the lines 3—3 of FIG. 1;

FIG. 5 is an end view taken along the lines 5—5 of FIG. 4;

FIG. 6 is a front view taken along the lines 6—6 of FIG. 4;

FIG. 7 is an isometric view of yet another embodiment of the chafing stand of FIG. 1;

FIG. 8 is a plan view of the lower rim shown in FIG. 7;

FIG. 9 is a plan view of another embodiment of the lower rim shown in FIG. 7;

FIG. 10 is an isometric view of yet another embodiment of the chafing stand of FIG. 1;

FIG. 11 is a view of the combination handle and wire leg of FIG. 10;

FIG. 12 is a partial view of the wire leg arrangement of the wire chafing stand in FIG. 1 showing another embodiment of a wire holder connector assembly in accordance with the present invention;

FIG. 13 is a cross sectional end view of the stand of FIG. 1 taken along the lines 13—13 of FIG. 12; and FIG. 14 is a cross sectional front view of the stand of FIG. 1 taken along the lines 14—14. of FIG. 12.

DETAILED DESCRIPTION OF THE INVENTION

Figure 1:
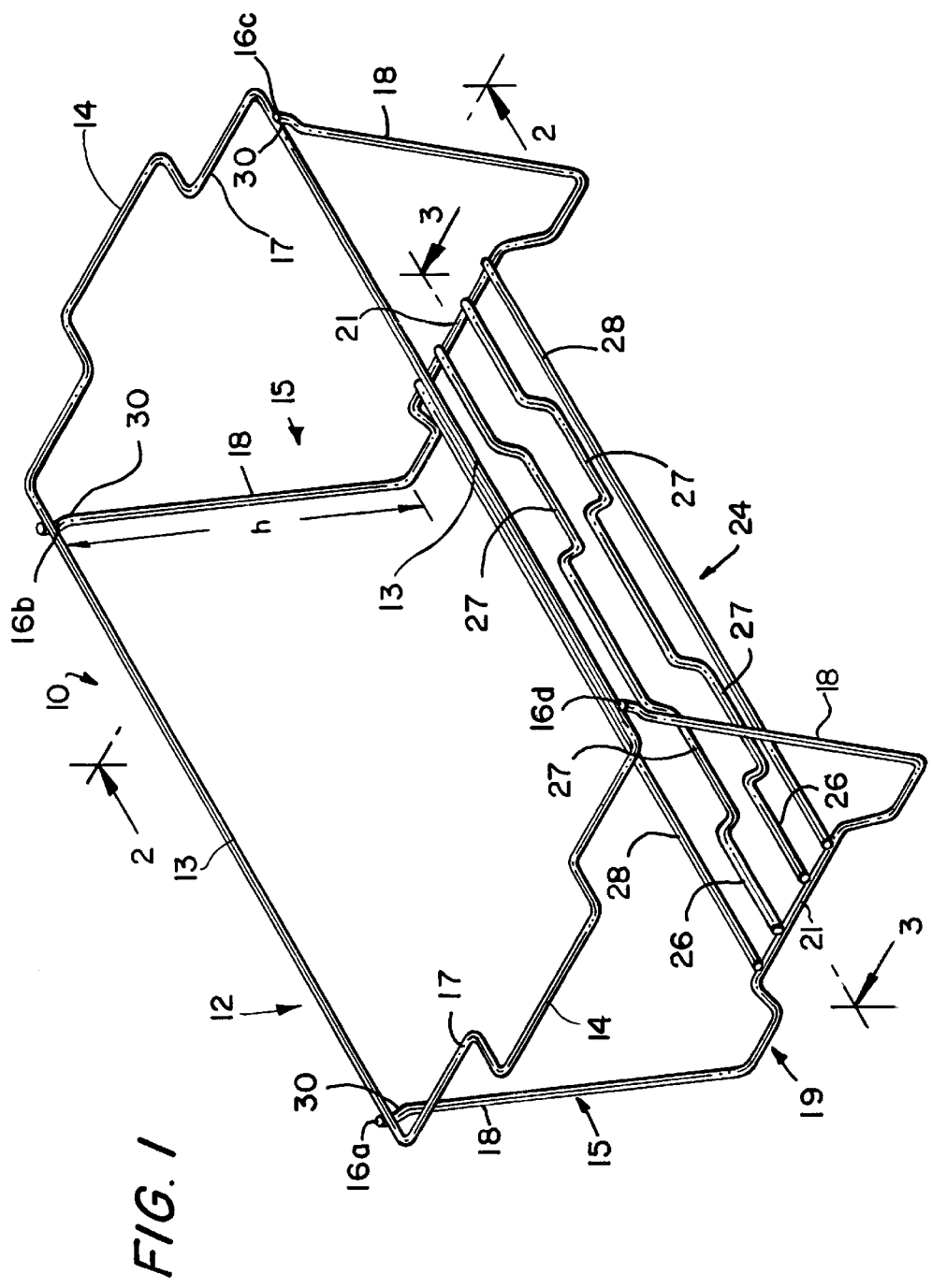
FIG. 1 is an isometric view of a preferred embodiment of the chafing stand of the present invention.

Referring now in detail to FIGS. 1–3 representing a preferred embodiment of the chafing stand 10 of the present invention. The stand 10 includes only a single rim 12 of generally rectangular geometry, a handle 14 integrally formed on each opposite lateral side of the rim 12 and two wire legs 15 extending from the rim 12. The rim 12 is preferably formed of a single continuous wire with the handles 14 formed in one operation. The construction of the chafing stand 10 with only a single rim and two wire legs on opposite sides thereof permits the legs to be moved relatively deeper when stacking a plurality of stands 10 together thereby allowing a greater number of stands to be stacked within a given space for storage and transportation relative to the number of stands having the construction shown in U.S. Pat. No. 5,921,513. This creates a shorter stack of stands in a given vertical height.

The two wire legs 15 are welded to the rim 12 on the opposite longitudinal sides 13 of the stand 10 at points 16a, 16b, 16c and 16d and may be placed relatively close to each lateral side 17. Each wire leg 15 has two upstanding side sections 18 interconnected by a bottom section 19. The upstanding side sections 18 may be tapered to lie at an inclined angle relative to the bottom section 19 as shown in FIGS. 1 and 2 or may be perpendicular thereto as shown in the embodiment of FIGS. 9 and 11. The bottom section 19 may be formed of three segments 20, 21 and 22 as shown more clearly in FIG. 2 with the outer segments 20 and 22 being level and in alignment relative to one another for placement level with the ground and with the intermediate segment 21 raised to an elevated level. A wire holder connector assembly 24 bridges each raised segment 21 and is of a configuration to support a plurality of chafing fuel heaters 25, as shown in FIGS. 2 and 3. The wire holder connector assembly 24 includes two parallel wire rod connectors 26, each having a configuration with two depressed sections 27 in which the chafing fuel heaters 25 are mounted and two straight wires 28 in parallel alignment with the connectors 26 with one wire 28 located on each opposite side of a wire connector 26 to hold the chafing fuel heaters 25 secure within the depressed sections 27.

To facilitate nesting between a multiple number of wire stands 10 each wire leg 15 has an offset 30 located in the upstanding section 18 just below the welded interconnections 16a–16d. The offsets 30 may be formed by a bending or crimping operation or by stamping each leg 15 in a press to indent the wire leg 15 to cause a lateral displacement at each interconnection of the wire leg 15 and the rim 12. The offsets 30 enable the wire legs 15 in one wire chafing stand 10 to readily nest within another wire chafing stand 10 so that the rim 12 of each stand will lie in relative close proximity without wedging. As such, each of the nested wire stand 10 may be easily separated from one another. The leg sections 18 preferably taper inwardly as the wire legs 15 extend downwardly from the rim 12 to the bottom section 19 although they may be parallel, as shown in FIGS. 9 and 11.

Figure 4:
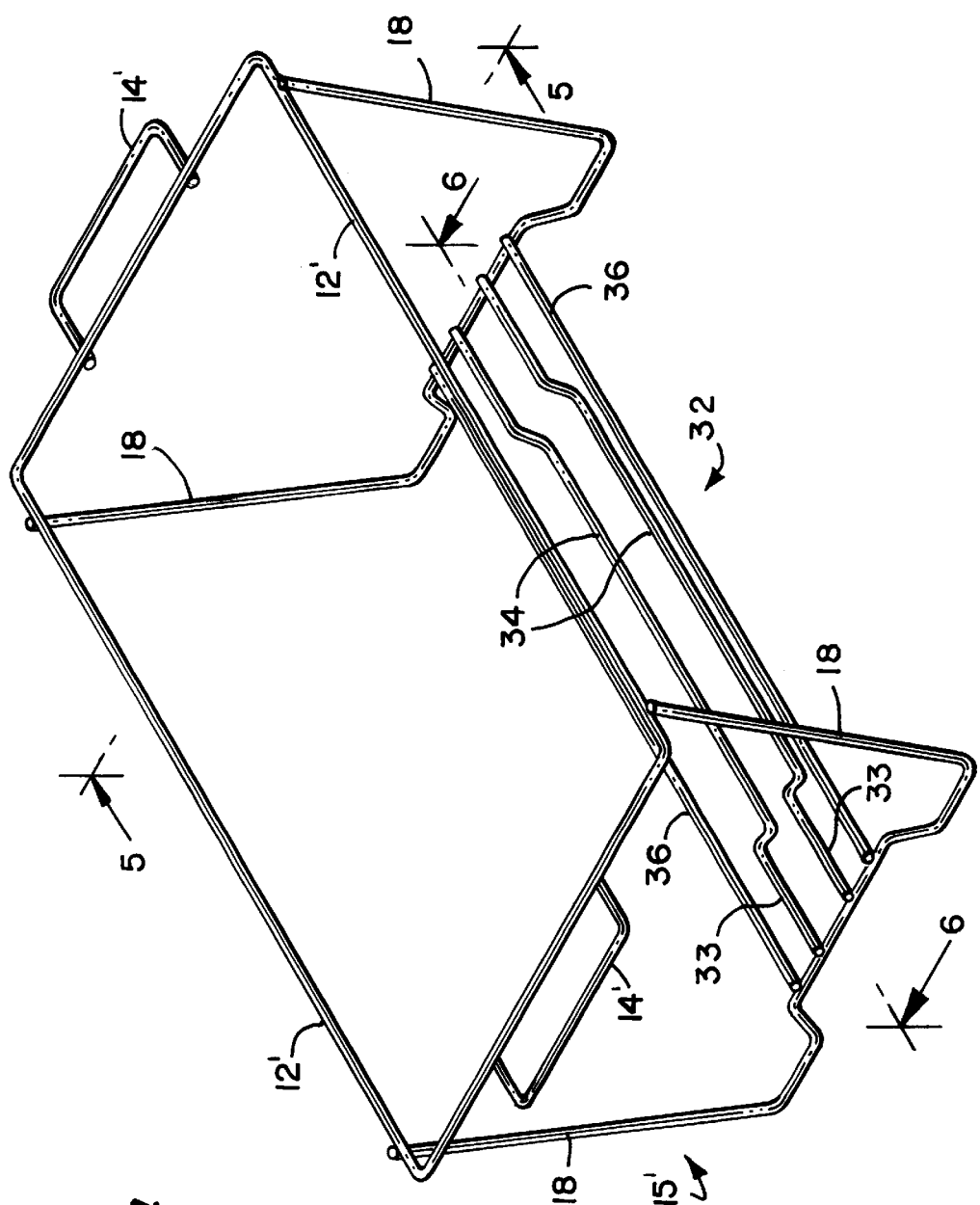
FIG. 4 is an isometric view of another embodiment of the chafing stand of FIG. 1.

Another embodiment of the invention is shown in FIGS. 4–6, which relies only on the taper of the side sections 18 of each wire leg 15 to facilitate nesting of multiple stands 10. The wire legs in this embodiment do not include offsets 30. Accordingly, the ability to nest a multiple number of chafing stands 10 for this embodiment is primarily dependent upon the degree of taper of the side sections 18 for the rims 12 to nest close together. Although the stands 10 in this embodiment will not nest as well as in the embodiment of FIGS. 1–3 this embodiment is much less expensive to manufacture. In all of the embodiments, the handles 14 may be separately welded to the rim 12 to further simplify manufacturing and a wire holder connector assembly 32 may be used having two wire connectors 33 with each having only one depressed portion 34 to hold chafing fuel heaters 25. Moreover, only two straight wires 36 are needed on opposite sides of the connectors 33 to provide support for the chafing fuel heaters 25 when placed in the depressed portion 34. The two straight wires 36 are placed in parallel alignment with the connectors 33 with one wire 36 located on each opposite side of a wire connector 33 to hold the chafing fuel heaters 25 secure within the depressed sections 34.

Another embodiment of the present invention employs the wire holder connector assembly 24 of FIG. 1 with a chafing stand 40, as shown in FIG. 7, and is otherwise similar in construction to the arrangement taught in U.S. Pat. No. 5,921,513. The wire chafing stand 40 includes both an upper rim 42, a lower rim 43 and a plurality of wire legs 44 which extend below the lower rim 43 to support the stand 40 on ground level. The wire holder connector assembly 24 is identical to its counterpart in the embodiment of FIG. 1 for supporting a plurality of chafing fuel heaters 25. Alternatively, the wire holder connector assembly 32, as shown in FIG. 4, may be used with the chafing stand 40 connected to the lower rim 43 as shown in FIG. 8.

Yet another embodiment of the invention is shown in FIGS. 9–11 in which a chafing stand 50 is shown having an upper rim 52 and a lower rim 53 interconnected to one another using only two wire legs 54. Each of the wire legs 54 is formed from a single continuous wire rod in a configuration forming a lower flat bottom section 55 extending below the lower rim 53 to support the stand 50 at ground level and two upright substantially vertical sections 56 and 57 which are interconnected by a wire rod member 58 in a U shaped configuration to function as a handle for the chafing stand 50. One of the wire legs 54 is separately shown in an enlarged view in FIG. 11. The stand 50 includes a wire holder connector assembly 24 as shown in FIG. 10 connected to the lower rim 53 of the stand 50. The wire holder connector assembly 24 is identical to its counterpart wire holder connector assembly as shown in the embodiment of FIG. 1 for supporting a plurality of chafing fuel heaters 25. Alternatively, a wire holder connector assembly 32, as shown in the embodiment of FIG. 8, may be used with the chafing stand 50.

FIGS. 12–14 is another alternate embodiment of a wire holder connector assembly 60 for supporting a plurality of chafing fuel heaters 25 employing only one wire rod connector 61 to bridge the raised segments 21 of two wire legs 15, as in the embodiment of FIG. 1, and a plurality of ring like members 62 welded to the connector 61 and bent to form a cup like shape which will support chafing fuel heaters 25, as shown in FIGS. 13 and 14. This embodiment of the wire holder connector assembly 60 may be substituted for the wire holder connector assembly in any of the other chafer stand embodiments of the present invention.

I claim:

1. A wire chafing stand comprising a frame formed of steel wire rod comprising a single rim configured in any desired geometry having lateral sides and a longitudinal axis extending from said lateral sides and only two wire legs lying in planes transverse to said longitudinal axis with each wire leg having only two upright segments affixed to the rim at a location substantially adjacent the lateral sides and a bottom section interconnecting the upright segments for supporting the stand on a level surface and further comprising a wire connecting assembly bridging the bottom section of each wire leg for supporting a plurality of chafing fuel heaters, wherein said wire connecting assembly comprises wire rods with at least one depressed or raised portion for forming a holder for a chafing fuel heater and substantially straight wire rod members on opposite sides of said depressed or raised portion for supporting the chafing fuel heater in the depressed or raised portion.

2. A wire chafing stand as defined in claim 1 wherein said rim is substantially rectangular in geometry and includes longitudinal sides to which each wire leg is connected.

3. A wire chafing stand as defined in claim 2 wherein each of said two upright segments includes an offset at a location adjacent the point of interconnection to the longitudinal sides of the rim.

4. A wire chafing stand as defined in claim 2 wherein the bottom section of each wire leg comprises a pair of flat segments and a raised section located intermediate the flat segments.

5. A wire chafing stand as defined in claim 4 wherein said wire connecting assembly bridges each raised section of each wire leg.

6. A wire chafing stand as defined in claim 2 wherein the lateral sides of said rim include an integrated handle for manually holding the stand.

7. A wire chafing stand as defined in claim 2 wherein each of the upright segments of said wire legs lie at an inclined angle relative to said bottom section.

8. A wire chafing stand as defined in claim 2 wherein each of the upright segments of said wire legs lie substantially perpendicular to said bottom section.

9. A wire chafing stand as defined in claim 1 wherein said wire rods form only a single depressed portion of substantial length in the direction parallel to the longitudinal side of the rim sufficient to hold at least two chafing fuel heaters in said single depressed portion.

10. A wire chafing stand as defined in claim 1 wherein said wire rods form at least two depressed portions adjacent one another for holding individual chafing heaters in each of the depressed portions.

11. A wire chafing stand comprising a rim wire steel which forms a closed geometrical configuration circumscribing a given surface area and at least two wire legs for supporting said stand at opposite ends thereof with each wire leg having upright sections terminating at a free end affixed to said rim with an offset adjacent each free end to facilitate the nesting of a multiplicity of stands into one another without significant wedging and further comprising a wire connecting assembly for supporting a plurality of chafing fuel heaters with the wire connecting assembly including wire rods extending longitudinally and containing at least one depressed portion for forming a holder for chafing fuel heaters and straight wire rod members lying parallel to said wire rods opposite said depressed portion(s) for supporting the chafing fuel heaters in the depressed portion(s).

\* \* \* \* \*